Patented June 5, 1923.

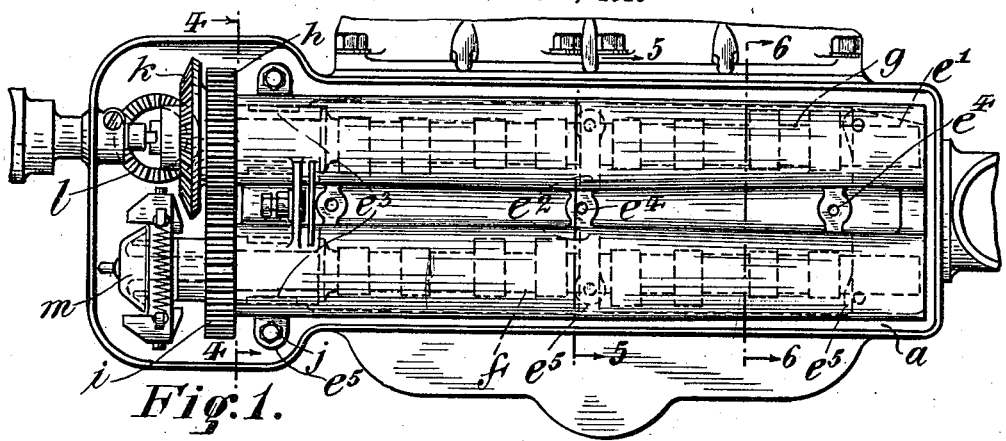
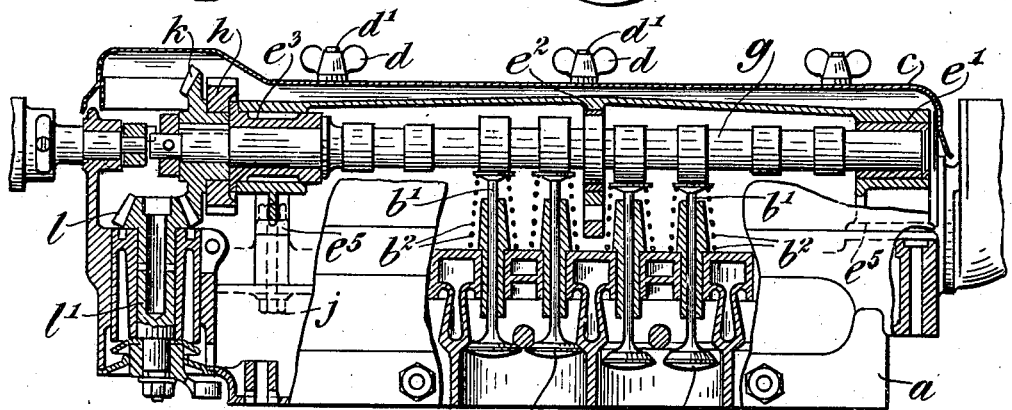
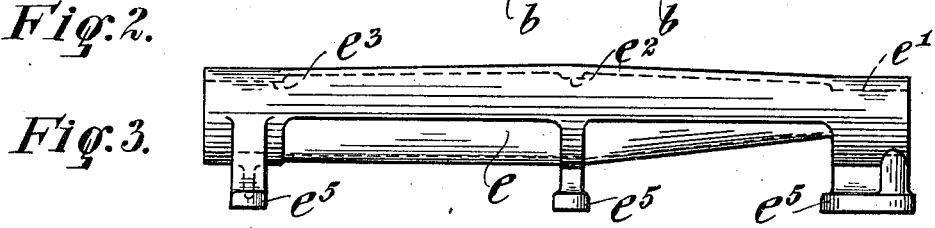
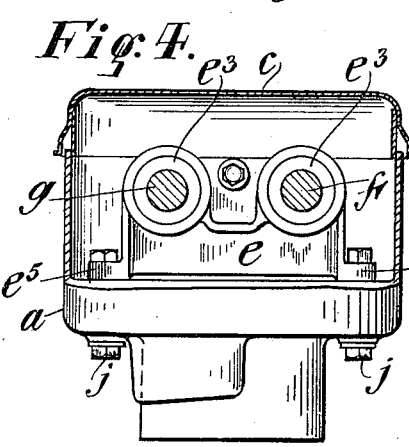
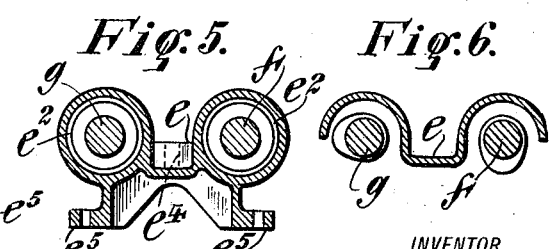

1,457,707

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

CAM-SHAFT UNIT.

Application filed June 5, 1919. Serial No. 302,056.

*To all whom it may concern:*

Be it known that I, AUGUST H. LEIPERT, a citizen of the United States, residing in the borough of Queens, of the city of New York, in the State of New York, have invented certain new and useful Improvements in Cam-Shaft Units, of which the following is a specification, reference being had to the accompanying drawing, forming a part hereof.

In internal combustion engine practise, it is customary to support the cam shafts for the inlet and exhaust valves in bearings which are carried by the engine casing. The effect of this is to subject these bearings to heat conducted by the supports from the walls of the engine. Further, this construction does not afford the greatest facility in the mounting and demounting of the cam shafts and does not permit the bearings thereof to be removed from the engine with the shaft as an integral unit. The object of the present invention is to provide a unitary mounting for the bearings of the two cam shafts, which is supported on the engine head and which prevents the direct conduction of heat to the bearings from the engine walls and permits the removal of the cam shafts with their bearings as a unit and without disturbance of any of the associated parts of the engine. The invention will be described in greater detail in connection with the accompanying drawing, in which—

Figure 1 is a view in plan of an engine provided with the improved cam shaft mounting, the cover plate being removed.

Figure 2 is a view in section through the engine and the cam shaft mounting showing the relation thereof to the cylinder head.

Figure 3 is a detail view in side elevation of the improved cam shaft mounting.

Figure 4 is a view in transverse section through the cam shafts taken on the plane indicated by the line 4—4 of Figure 1 and looking in the direction of the arrows.

Figure 5 is a view in transverse section through the cam shaft mounting taken on the plane indicated by the line 5—5 of Figure 1 and looking in the direction of the arrows.

Figure 6 is a view in transverse section taken through the improved mounting on the plane indicated by the line 6—6 of Figure 1 and looking in the direction of the arrows.

The engine head shown in Figure 2 comprises a walled member $a$, in which are supported the usual valves $b$, and a cover plate $c$ which may be secured in place by wing nuts $d$, permitting ready access to the engine head. On the engine head is supported the improved one-piece mounting $e$ which extends longitudinally thereof and is provided with suitable bearings $e'$, $e^2$ and $e^3$ for the cam shafts $f$ and $g$. This mounting is integral throughout and may be bolted to the engine head by means of bolts $j$ passing through any available portion of the engine head according to its configuration and through the lugs $e^5$ or bolt holes formed in the mounting. It is preferred to make the mounting cylindrical throughout at the points where the bearings $e'$, $e^2$ and $e^3$ are provided, while it is sufficient to make the mounting generally semi-circular in form at intermediate sections, as indicated clearly in Figure 6. By this construction lightness is secured and the cam shafts with the valve stems $b'$ and springs $b^2$ are exposed to view. The valve mounting may be provided with bolt holes $e^4$ at suitable points to receive the bolts $d'$ on which the wing nuts $d$ are secured for the purpose of securing the cover plate $c$ removably in position. On the ends of the cam shafts may be secured engaging spur gears $h$, $i$, and on one of the shafts $g$ may be keyed a bevel gear $k$ for engagement with the driving bevel pinion $l$ secured on a shaft $l'$ which may be rotated from the crank shaft in a manner well known. The other cam shaft $f$ may carry on its end a governor $m$ by means of which the speed of the engine may be controlled through suitable connections which constitute no part of this invention. The gears $k$, $h$ and $i$ and the governor $m$, all being supported on the cam shafts $f$ and $g$ in the manner described, become a part of the unitary structure which constitutes the essential characteristic of the improved construction, and will be removed with the cam shafts when the mounting $e$ is detached from the engine head.

By the construction described, it is evident that the heat transmitted to the bearings $e'$, $e^2$, $e^3$ through the supporting standards $e^5$ of the mounting is negligible since the mounting is carried on the engine head and has no direct connection with the cylinder walls or casing. Accordingly, these bearings $e'$, $e^2$, $e^3$ are not subject to that excessive heat which has been found objectionable in common practise.

To secure the improved mounting in place, the cam shafts having been assembled therein, the cover plate $c$ is removed from the engine head and the mounting fastened in place by means of the bolts $j$, the heads of which are freely accessible. When it is desired to remove the cam shafts or to expose the valve stems $b'$ and their springs $b^2$, the reverse operation is effected, without disturbing the engine head $a$ or any of the associated elements of the engine.

Aside from the advantages particularly pointed out herein it is evident that the construction is a very substantial improvement in manufacturing considerations over the ordinary means now employed for supporting cam shafts.

Changes in design and relation of elements may be made without departing from the scope of the invention provided such changes fall within the terms of the appended claim.

I claim as my invention:

In combination with an engine head, two sets of valves and two actuating cam shafts therefor, respectively, a driving gear carried on one cam shaft, meshing gears carried on the cam shafts whereby rotation is imparted from the first named cam shaft to the other, a one-piece mounting carrying bearings for said shafts and open at its lower side to expose the cams to the valve stems, means to secure the mounting removably to the engine head whereby it may be removed from the head with the cam shafts and gears without disturbing the associated elements of the engine and leaving the valves in place in the engine, and a separate cover plate removable independently of the mounting and completely encasing said mounting and valve stems.

This specification signed this 3rd day of June, A. D. 1919.

AUGUST H. LEIPERT.